United States Patent [19]

Hiraga et al.

[11] 4,349,519

[45] Sep. 14, 1982

[54] PURIFICATION OF WET PROCESS PHOSPHORIC ACID

[75] Inventors: Yoichi Hiraga, Shin-nanyo; Osamu Watanabe; Masaki Nakatani, both of Tokuyama, all of Japan

[73] Assignee: Toyo Soda Manufacturing Company, Ltd., Shin-nanyo, Japan

[21] Appl. No.: 214,671

[22] Filed: Dec. 9, 1980

[30] Foreign Application Priority Data

Jan. 14, 1980 [JP] Japan ..................................... 55-2135

[51] Int. Cl.$^3$ .............................................. C01B 25/16
[52] U.S. Cl. ............................. 423/321 S; 423/321 R
[58] Field of Search ................. 423/321 S, 321 R, 320

[56] References Cited

U.S. PATENT DOCUMENTS

| | | | |
|---|---|---|---|
| 1,929,441 | 10/1933 | Milligan | 423/321 S |
| 3,607,029 | 9/1971 | Goret et al. | 23/165 |
| 4,117,092 | 9/1978 | Beltz et al. | 423/321 S |
| 4,118,462 | 10/1978 | Desire et al. | 423/321 |

FOREIGN PATENT DOCUMENTS

| | | | |
|---|---|---|---|
| 464370 | 4/1937 | United Kingdom | 423/321 S |
| 1521457 | 8/1975 | United Kingdom | |

OTHER PUBLICATIONS

European Chemical News, Jul. 2, 1976, p. 24.
Chemical Engineering Progress, Nov., 1980, pp. 41–45.

*Primary Examiner*—Herbert T. Carter
*Assistant Examiner*—Gregory A. Heller

*Attorney, Agent, or Firm*—Oblon, Fisher, Spivak, McClelland & Maier

[57] ABSTRACT

A wet process phosphoric acid obtained by an solvent extraction method with n-butanol and/or isobutanol comprises (a) feeding a wet process phosphoric acid having a concentration of $P_2O_5$ of higher than 35 wt. % into an extraction battery;

(b) adding sulfuric acid into a stage in fifth or higher stage from the step of discharging an extracted solution and in second or higher stage from the step of discharging raffinate in the extraction battery at a gram equivalent ratio given by subtracting the amount of sulfuric acid in the wet process phosphoric acid fed into the extraction battery from 1.2 to 2.0 times of the sum of total cation impurities in the wet process phosphoric acid fed into the extraction battery and total components of sodium, potassium and magnesium added to the purification battery;

(c) discharging said extracted solution having a concentration of $H_3PO_4$ of 130 to 180 g./liter from said extraction battery;

(d) adding at least one of the compounds of sodium, potassium and magnesium in second or higher stage from the step of discharging the solvent phase and in second or higher stage from the step of discharging the aqueous phase in the purification battery to give more than 0.4 equivalent per liter of the concentration of sodium, potassium and magnesium in the aqueous phase in the stage where at least one of alkali metal and magnesium compounds is added in the same battery.

3 Claims, 2 Drawing Figures

PURIFICATION OF WET PROCESS PHOSPHORIC ACID

BACKGROUND OF THE INVENTION

1. Field of the Invention

The present invention relates to a purification of a wet process phosphoric acid by a solvent extraction with butanol as a solvent.

In the specification, the following terms are defined as follows. "Wet process phosphoric acid" means wet process phosphoric acid prepared by treating a phosphate rock with sulfuric acid. "Butanol" means n-butanol and 1 or isobutanol. "NAKMG" means sodium, potassium or magnesium. "NAKMG compound" means "one or more oxides, hydroxides, carbonates or phosphates of NAKMG. "Solvent extraction" means a treatment comprising an extraction battery, a purification battery and a stripping battery. "Extraction battery" means a battery for extracting phosphoric acid into a solvent phase by contacting a solvent with wet phosphoric acid and an aqueous phase discharged from the purification battery by a counter current extraction method. "Purification battery" means a battery for extracting impurities into an aqueous phase by contacting a high purity phosphoric acid aqueous solution with an extracted solution obtained by an extraction battery by a counter current extraction method. "Stripping battery" means a battery for extracting phosphoric acid into an aqueous phase by contacting pure water with the solvent phase obtained from the purification battery.

The present invention is characterized by purifying the wet process phosphoric acid having high concentration to obtain high purity phosphoric acid in high yield even though butanol is used as a solvent.

2. Description of the Prior Arts

Most of cation impurities in the wet process phosphoric acid are in the form of phosphates which are not easily extracted with a solvent and whose solubilities are decreased depending upon decrease in the concentration of phosphoric acid. Therefore, scaling is easily caused in the stage of low concentration of phosphoric acid in the extraction battery near the stage for discharging the raffinate. In accordance with the simple process for contacting butanol with the wet process phosphoric acid, the yield of phosphoric acid can not be high enough and is about 50 to 70%. Among the known process for improving the yield, the process for incorporation of hydrochloric acid in the extraction battery is the practically applicable process. In accordance with this process, it is easy to increase the yield, however, the hydrochloric process suffers from the following disadvantages.

(1) It is not easy to separate impurities of Zn, Cd and Sb from phosphoric acid. A separate complicated treatment for the separation is required. (U.S. Pat. No. 3,920,797 and Japanese Unexamined Patent Publication No. 17399/1974).
(2) Efficiency for separating the other impurities is inferior so as to increase the load for the purification battery.
(3) Hydrochloric acid is expensive.
(4) Corrosion resistance of the apparatus should be considered.

When sulfuric acid is used instead of hydrochloric acid, the yield is increased, however, the following disadvantages are found.

The wet process phosphoric acid usually contains 1 to 10 wt. % of sulfuric acid. It has been difficult to effectively remove sulfuric acid by the solvent extraction method. Therefore, the wet process phosphoric acid is treated with a calcium compound such as phosphate rock, calcium oxide and calcium hydroxide to remove sulfate ($SO_4$) as calcium sulfate before using it in the solvent extraction method. The resulting wet process phosphoric acid has high calcium content and accordingly, if sulfuric acid is incorporated in extraction battery, calcium sulfate is produced to cause the scaling. Therefore, it has been difficult to increase the yield with sulfuric acid as an industrial process. Consideration has been given to remove sulfuric acid group by treating purified phosphoric acid with a barium compound after the solvent extraction of the wet process phosphoric acid. However, the content of sulfate ($SO_4$) in the purified phosphoric acid is high to require large amount of expensive barium compound. Therefore, this process could not be practically used.

In order to increase the yield of phosphoric acid, it is preferable to use higher concentration of the wet process phosphoric acid. When the concentration of the wet process phosphoric acid is low, large amount of a solvent and many numbers of stages are required to increase the yield.

When the concentration of the wet process phosphoric acid is high, only small amount of solvent is required and the concentration of phosphoric acid in the extracted solution fed from the extraction battery to the purification battery is high. Usually, when the concentration of phosphoric acid in the extracted solution is high, it is not easy to separate impurities from phosphoric acid in the purification battery. However when the butanol is used as solvent, this tendency remarkable results are obtained. Therefore, in the conventional process using butanol, the wet process phosphoric acid having a concentration of $P_2O_5$ of 30 to 35 wt.% has been used to give a concentration of $H_3PO_4$ in the extracted solution of lower than 130 g./liter, usually about 100 g./liter even though there are disadvantages of (1) the requirement of a large amount of solvent and many numbers of stages (2) low concentration of purified phosphoric acid obtained from the washing battery, and (3) large load for concentration and large load for treatment of the raffinate obtained from the extraction battery. In the process for improving the yield by using hydrochloric acid, the separation of the impurities from phosphoric acid is inferior and accordingly, it has been further difficult to increase the concentration.

On the other hand, as described, even though the concentration of the wet process phosphoric acid is high, the concentration of phosphoric acid is low near the stage for discharging the raffinate in the extraction battery. In order to increase the yield, it is necessary to use a solvent having high extraction efficiency even though the concentration of phosphoric acid is low. Butanol can substantially completely extract phosphoric acid and is ideal from this viewpoint.

SUMMARY OF THE INVENTION

It is an object of the present invention to provide a process for purifying a wet process phosphoric acid with butanol as a solvent to improve the advantage and overcome the prior art disadvantage in the incorporation of sulfuric acid for increasing the yield.

The other objects of the present invention are to provide the process for purification having a following advantages:

(1) To prevent scaling and eliminate treatment for removing sulfate ($SO_4$) from the purified phosphoric acid and the wet process phosphoric acid even though sulfuric acid is incorporated in the extraction battery; and (2) satisfactorily removing impurities even though butanol is used as a solvent and to increase concentration of the wet process phosphoric acid to higher than 35 wt.% as $P_2O_5$ and the concentration of the extracted solution is increased higher than 130 g./liter as $H_3PO_4$.

The foregoing and other objects of the present invention have been attained by providing a process for purifying a wet process phosphoric acid obtained by a solvent extraction method with butanol which comprises (a) feeding a wet process phosphoric acid having a concentration of $P_2O_5$ of higher than 35 wt.% into an extraction battery;

(b) adding sulfuric acid into a stage in fifth or higher stage from the step of discharging an extracted solution and in second or higher stage from the step of discharging raffinate in the extraction battery at a gram equivalent ratio given by subtracting the amount of sulfuric acid in the wet process phosphoric acid fed into the extraction battery from 1.2 to 2.0 times of the sum of total cation impurities in the wet process phosphoric acid fed into the extraction battery and total components of NAKMG added to the purification battery;

(c) discharging said extracted solution having a concentration of $H_3PO_4$ of 130 to 180 g./liter from said extraction battery;

(d) adding at least one of NAKMG compound in second or higher stage from the step of discharging the solvent phase and in second or higher stage from the step of discharging the aqueous phase in the purification battery to give more than 0.4 g. equivalent per liter of the concentration of NAKMG compound in the aqueous phase in the stage where NAKMG is added in the same battery.

DETAILED DESCRIPTION OF THE PREFERRED EMBODIMENTS

Figure 1:
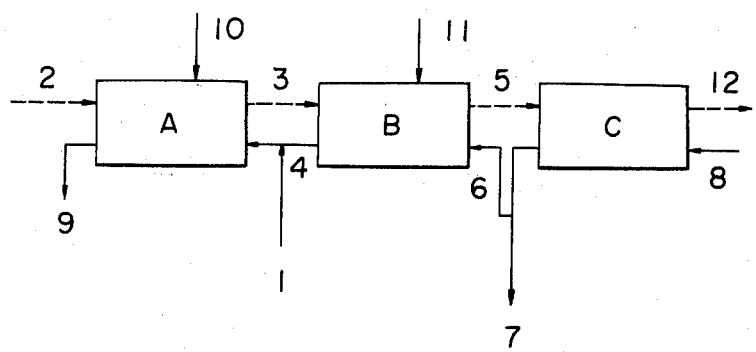
FIG. 1 is a diagram of one embodiment of the process for purification according to the present inventions

FIG. 1 is a diagram of one embodiment of the process for purification of the sulfuric acid type wet process phosphoric acid.

Referring to FIG. 1, the process of the present invention will be illustrated.

In the extraction battery (A), butanol (2) is brought into contact with the wet process phosphoric acid having a concentration of $P_2O_5$ of higher than 35 wt.% (1) and the aqueous phase (4) fed from the purification battery (B) with sulfuric acid (10) by a counter current extraction method. The place for adding sulfuric acid (10) is fifth or higher stage from the stage for discharging the extracted solution (3) and second or higher stage from the stage for discharging the raffinate (9). The sulfuric acid is added at ratio given by subtracting the amount of sulfuric acid in the wet process phosphoric acid (1) from 1.2 to 2.0 times of the sum of gram equivalents of total cation impurities in the wet process phosphoric acid (1) and total components of NAKMG (11) added to the purification battery (B). The amount of butanol (2) is controlled to give 130 to 180 g./liter of a concentration of $H_3PO_4$ in the extracted solution (3). The raffinate (9) is treated to separate phosphate.

In the process of the present invention, the amount of the raffinate (9) is small because the amount of the wet process phosphoric acid is small whereby the cost for the treatment is economical.

In the purification battery (B), the extracted solution (3) obtained from the extraction battery (A) is brought into contact with the high purity phosphoric acid aqueous solution usually a part of the purified phosphoric acid (7) obtained in the stripping battery (C) with the sodium compound (11) by the counter current extraction method to move the impurities from the extracted solution (3) into the aqueous phase (4) to discharge them. The place for adding the sodium compound (11) is the second or higher stage from the stage for discharging the solvent phase (5) and the second or higher stage from the stage for discharging the aqueous phase (4). The amount of the sodium compound is to give more than 0.4 g. equivalent / liter of the concentration of NAKMG in the aqueous phase in the stage added.

In the stripping battery (C), pure water (8) is brought into contact with the solvent phase (5) obtained by removing the impurities in the purification battery (B) to obtain the purified phosphoric acid by extracting phosphoric acid into the aqueous phase. The solvent phase (12) discharged is recycled as a solvent into the extraction battery (A).

The wet process phosphoric acid (1) used in the present invention should have a concentration of $P_2O_5$ of higher than 35 wt.%, preferably higher than 40 wt.% as described below. When the phosphoric acid obtained by separating solid components from the slurry obtained by reacting the phosphate rock with sulfuric acid has a desired concentration, it can be used as the raw material. If it has a concentration, lower than the desired concentration, it can be concentrated. It is also possible to remove organic impurities by treating it with activated carbon or to remove silicofluoride by treating it with sodium compound.

The treatment for removing sulfate with a calcium compound is not desirable as mentioned above, though the treatment for removing sulfate can be carried out to decrease the content of sulfuric acid from 1 to 10 wt.% to 0.5 wt.%. The problem of the scaling in the extraction battery is not considerable in such content of sulfuric acid.

When the concentration of the wet process phosphoric acid fed to the extraction battery is decreased, the separation of the impurities from phosphoric acid is easily attained, however disadvantages of low yield, increase of an amount of the solvent, increase of the required stage and increase of an amount of the raffinate are caused. In the process of the present invention, the concentration of the wet process phosphoric acid can be high such as more than 35 wt.% as $P_2O_5$ preferably more than 40 wt. % as $P_2O_5$ because sulfuric acid is used instead of hydrochloric acid for the increase of the yield as well as the sodium compound is used in the purification battery to improve not only the separation of sulfate but also other impurities.

On the other hand in the conventional process, the concentration of the wet process phosphoric acid should be less than 35 wt.% as $P_2O_5$. The effect of the concentration of phosphoric acid is shown in Table wherein the flow ratio and the number of stages are in the practical ranges.

TABLE

| Concentration of wet process phosphoric acid ($P_2O_5$ wt.%) | 45 | 40 | 35 | 30 |
|---|---|---|---|---|
| Yield (*1) | 100 | 98 | 95 | 85 |
| Required number of stages (*2) | 1.0 | 1.3 | 1.6 | 4.3 |

Note
(*1): The yield as an index number in rating 100 at the concentration of the wet process phosphoric acid of 45 wt. % under constant other conditions.
(*2): The required number of stages for the same yield as index number in rating 1.0 at the concentration of the wet preocess phosphoric acid of 45 wt. % as $P_2O_5$.

Sulfuric acid (10) should be fed to the fifth or higher stage from the stage discharging the extracted solution (3) and the second or higher stage from the stage discharging the raffinate (9) at a gram equivalent ratio given by subtracting the amount of sulfuric acid in the wet process phosphoric acid (1) from 1.2 to 2.0 times of the sum of total cation impurities in the wet process phosphoric acid and he total components of NAKMG (11) fed to the purification battery.

This condition is important for the following effects under the other required condition of the present invention:

(i) the yield of phosphoric acid is increased to be maximum;
(ii) the added sulfuric acid is not substantially moved into the extracted solution (3) (It is not prevented to move a part of sulfuric acid in the wet process phosphoric acid (1) into the extracted solution (3).)
(iii) the added sulfuric acid is substantially used. In order to impart the effect of (iii), the stage for feeding sulfuric acid (10) is the fifth or higher stage from the stage discharging the extracted solution (3) and is preferably highly departed from the stage for discharging the raffinate (9). Even though the stage is higher than the fifth stage from the stage (9), the effect is not substantially improved from the effect of the fifth stage.

The sulfuric acid fed into the extraction battery reacts with the phosphate in the wet process phosphoric acid to form sulfate and phosphoric acid. The sulfuric acid is converted into sulfate which is easily extracted into the aqueous phase. On the other hand, the phosphate is converted into phosphoric acid which is easily extracted into the solvent phase. The fact for increasing the yield of phosphoric acid by the addition of sulfuric acid is given by such effect of sulfuric acid.

The inventors have found the fact that the yield of the phosphoric acid is improved by the sulfate. That is, sulfuric acid is converted into sulfate to attain the increase of the yield of phosphoric acid in view of the two kinds of effects. Magnesium sulfate has remarkable effect. When the wet process phosphoric acid having low content of magnesium is used as a starting material, the yield of phosphoric acid is remarkably increased by adding a magnesium compound in the purification battery (B) in comparison with the addition of the other sodium compound (NAKMG compound).

In accordance with the process of the present invention, the separatability of the impurities from phosphoric acid is remarkably high. Therefore, it is preferable to use smaller amount of butanol (2) fed into the extraction battery (A). In the process of the present invention using the wet process phosphoric acid (1) having a concentration of higher than 35 wt.% as $P_2O_5$, the amount of butanol (2) is selected so as to give a concentration of phosphoric acid of 130 to 180 g./liter preferably 150 to 170 g./liter as $H_3PO_4$ in the extracted solution (3) whereby phosphoric acid in the wet process phosphoric acid is substantially extracted.

In the purification battery of the present invention, the impurities can be easily, completely removed from the extracted solution having such high concentration of phosphoric acid.

In the conventional process, the separatability of the impurities is not satisfactory as mentioned above, and accordingly, it is obliged to give a low concentration of phosphoric acid of the extracted solution as lower than 130 g./liter usually about 100 g./liter.

The separatability of the impurities from phosphoric acid is given by a selectivity $\beta$.

$\beta = K_{(Im)}/K_{(H_3PO_4)}$ wherein $K_{(Im)}$ and $K_{(H_3PO_4)}$ respectively represents each distribution coefficient of the imputies and the phosphoric acid as the concentration in the aqueous phase/the concentration in the solvent phase.

The selectivity of sulfuric acid is remarkably small for example it is 1.5 when n-butanol is used as the solvent. When the selectivity is 1.5, it is theoretically separable in the purification battery (B), however, the separation is not satisfactorily attained in a practical operation. In order to substantially remove sulfuric acid in the industrially acceptable number of stages with the amount of the pure phosphoric acid (6), the selectivity is usually higher than 3 preferably higher than 5.

The inventors have found that when ions of NAKMG are incorporated in the aqueous phase, the selectivity of sulfuric acid and other impurities are remarkably improved in the use of n-butanol or isobutanol as the solvent.

The following table shows the selectivities of sulfate in the use of n-butanol as the solvent (measured by the inventors).

TABLE

| Na concentration in aqueous phase (g./liter) | Selectivity $\beta$ |
|---|---|
| 0 | 1.5 |
| 10 | 2.2 |
| 15 | 2.3 |
| 27 | 4.2 |
| 43 | 7.0 |
| 50 | 8.4 |

The source of ions should be a source which does not produce disadvantageous anions when it is added into the purification battery. The above-mentioned sodium compounds are preferably used. When it is added in a form of chloride or nitrate, chloride ions and nitrate ions are easily extracted into the solvent phase. These ions contaminate the purified phosphoric acid and also adversely affected to the separation of the impurities from phosphoric acid in the solvent phase.

In accordance with the process of the present invention, the pretreatment of the wet process phosphoric acid with a calcium compound is not required by the effect of the sodium compounds, whereby sulfuric acid can be added into the extraction battery to increase the yield and the concentration of phosphoric acid can be increased.

Sodium ions are not substantially extracted into the solvent phase. When the sodium compound is added to the stage for discharging the solvent phase, the contamination of the purified phosphoric acid caused by carrying a part of the ions into the solvent phase can not be prevented. On the other hand, when the sodium compound is added to the stage for discharging the aqueous phase, the contact with the solvent phase containing the impurities such as sulfate is not enough. Therefore, the sodium compound should be added to the second or higher stage from the stage for discharging the solvent phase and the second or higher stage from the stage for discharging the aqueous phase. When it is added to the third to tenth stage from the stage for discharging the aqueous phase, the contact with the solvent phase is especially satisfactory.

When the amount of the sodium compound is controlled to give a concentration of the sodium compound of higher than 0.4 g. equivalent/liter preferably higher than 0.6 g. equivalent/liter in the aqueous phase at the stage for adding the sodium compound, the concentration of the sodium compound in the aqueous phase in the stages from the added stage to the stage for discharging the aqueous phase is maintained in substantially constant to substantially attain the removement of sulfate.

In accordance with the process of the present invention, numbers of stages in the extraction battery and the purification battery, the size of the apparatus and the amount of the solvent can be smaller than those of the conventional process. Moreover, a special equipment for removing sulfate group is not required. Thus, when large amounts of fluorine component and silicon component are included in the wet process phosphoric acid, there is possibility to precipitate sodium silicofluoride etc. in the extraction battery or the purification battery. It is possible to prevent the precipitation of the silicofluoride in the extraction battery and the purification battery by mixing the aqueous phase (4) discharged from the purification battery with the wet process phosphoric acid (1) before feeding them into the extraction battery (A) to separate the precipitate.

The pure phosphoric acid solution fed into the purification battery can be a part of the purified phosphoric acid obtained in the stripping battery.

In the process of the present invention, the sodium compound is added in the purification battery. The amount of the pure phosphoric acid solution need not to be more than that of the conventional process and can be 0.05 to 0.2 time of the solvent ratio on a volume basis.

In the process of the present invention, the concentration of phosphoric acid in the solvent phase (5) obtained in the purification battery can be high whereby the amount of water (8) in the stripping battery (C) can be decreased to completely extract phosphoric acid and to obtain the pure phosphoric acid having high concentration.

In the above-illustration, the sodium compound is used. It is possible to use the other NAKMG compound instead of the sodium compound.

The present invention will be further illustrated by certain examples wherein the terms of "%" and "ppm" means "% by weight" and "ppm by weight", and "yield" means "[(P$_2$O$_5$ in the wet process phosphoric acid -P$_2$O$_5$ in the raffinate)/(P$_2$O$_5$ in the wet process phosphoric acid)]×100".

A number of stage is calculated from the stage for feeding the extracted solution in the purification battery.

EXAMPLE 1

A wet process phosphoric acid having the following composition was obtained by treating phosphate rock with sulfuric acid and separating solid components from the resulting slurry and concentrating the filtrate to give 54% as P$_2$O$_5$ and diluting it with water.

| | |
|---|---|
| P$_2$O$_5$: | 45.0% |
| SO$_4$: | 1.7% |
| Si: | 0.02% |
| F: | 0.11% |
| Fe: | 0.19% |
| Al: | 0.06% |
| Ti: | 0.01% |
| Mg: | 0.26% |

A mixture of 100 wt. parts of the wet process phosphoric acid and 80 wt. parts of an aqueous phase obtained in the purification battery was in counter currently contact with n-butanol at a solvent ratio on a volume basis of n-butanol / the mixture of 4.3 in the extraction battery having ten stage extractors. In the third stage, 9.35 wt. parts of 98% sulfuric acid was added. The amount of sulfuric acid corresponds to 1.25 gram equivalent times given by subtracting 0.25 gram equivalent time of sulfuric acid in the wet process phosphoric acid from 1.50 gram equivalent times to the total of cations except hydrogen ions in the wet process phosphoric acid and sodium ions added to the purification battery.

Figure 2:
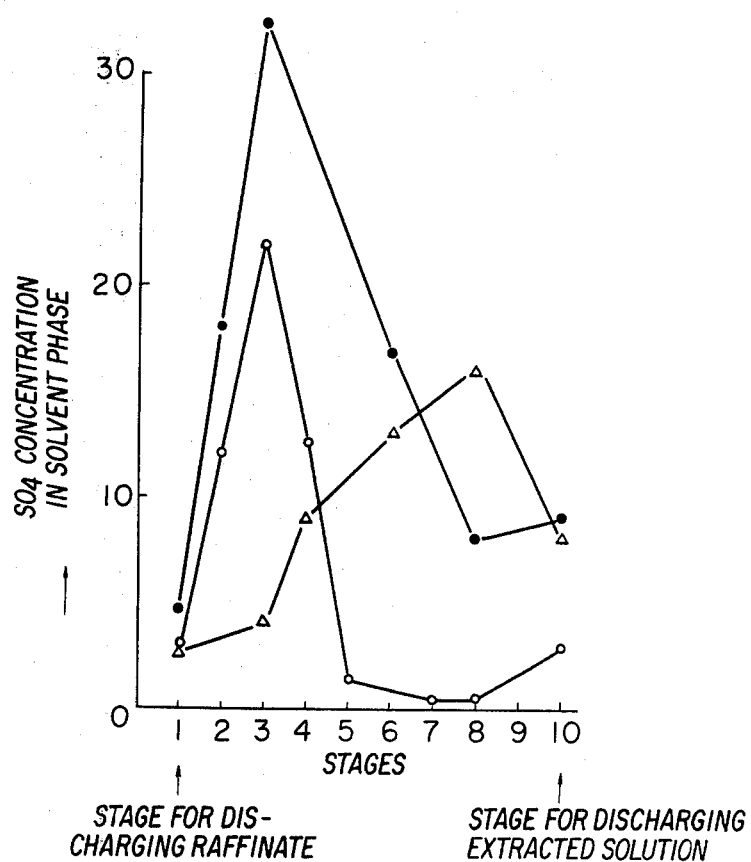
FIG. 2 is a graph showing ratios of concentrations of $SO_4$ is solvent phases (g/1) and stages of the extraction batteries in Example 1 and References 1 and 2.

The yield was 97.6%. The results of the analyses of SO$_4$ concentrations in the solvent phases in each of the stages are shown in FIG. 2. The added sulfuric acid effected only to the seventh stages and did not contaminate the extracted solution.

The composition of the extracted solution was as follows.

| | |
|---|---|
| H$_3$PO$_4$: | 165 g./liter |
| SO$_4$: | 3.0 g./liter |

In the purification battery having 15 stage extractors, the extracted solution was in counter current contact with the pure phosphoric acid solution obtained in the washing battery at a solvent ratio on a volume basis of solvent phase/pure phosphoric acid of 10. In the battery, 8.8 wt. parts of 48% sodium hydroxide solution was added into the tenth stage. As a result, the concentrations of sodium ion in the aqueous phases in the first to tenth stages in the purification battery were maintained to about 1.7 gram equivalent/liter.

Then, the solvent phase obtained in the purification battery was in counter current contact with pure water in the stripping battery having 12 stage extractors to obtain a pure phosphoric acid solution having the following composition.

| | | |
|---|---|---|
| H$_3$PO$_4$: | 33.3% | |
| SO$_2$: | 11 | ppm |
| Si: | 2 | ppm |
| F: | 3 | ppm |
| Fe: | <0.1 | ppm |
| Al: | <0.1 | ppm |
| Ti: | <0.1 | ppm |

| Na: | <1 ppm |
|---|---|

REFERENCE 1

In accordance with the process of Example 1, except adding 16.8 wt. parts of sulfuric acid (corresponding to 2.25 gram equivalent times to the total of cations except hydrogen ions in the wet process phosphoric acid and sodium ions added to the purification battery), the purification was carried out. The yield was increased to 98.5%, however, the $SO_4$ concentrations in the solvent phases in the stages were increased as shown in FIG. 2. The added sulfuric acid contaminated the extracted solution whereby the $SO_4$ concentrate of the pure phosphoric acid was increased to 1430 ppm.

REFERENCE 2

In accordance with the process of Example 1 except adding sulfuric acid to the eighth stage (third stage from the stage for discharging the extracted solution), the purification was carried out. The yield was decreased to 90.3%. The $SO_4$ concentrations of the solvent phases in the stages are shown in FIG. 2. The added sulfuric acid contaminated the extracted solution as Reference 1.

REFERENCE 3

In accordance with the process of Example 1 except that an aqueous solution of sodium hydroxide was not used, the purification was carried out to obtain a pure phosphoric acid solution having the following composition.

| $H_3PO_4$: | 33.5% |
|---|---|
| $SO_4$: | 5500 ppm |
| Si: | 80 ppm |
| F: | 300 ppm |
| Fe: | 5 ppm |
| Al: | 7 ppm |
| Ti: | 15 ppm |

EXAMPLE 2

In accordance with the process of Example 1 except using magnesium hydroxide powder at the same gram equivalent instead of sodium hydroxide, the purification was carried out to obtain a pure phosphoric acid solution having substantially the same quality. The yield was 98.5%.

EXAMPLE 3

A mixture of 100 wt. parts of the wet process phosphoric acid used in Example 1 and 60 wt. parts of an aqueous phase obtained in the purification battery was in counter current contact with isobutanol a solvent ration on a volume basis of isobutanol/the mixture of 5.5 in the extraction battery having 12 stage extractors. In the fourth stage, 6.85 wt. parts of 98% sulfuric acid was added. The amount of sulfuric acid corresponds to 1.42 gram equivalent times given by subtracting 0.38 gram equivalent time of sulfuric acid in the wet process phosphoric acid from 1.8 gram equivalent times to the total of the cations except hydrogen ions in the wet process phosphoric acid and potassium added to the purification battery. The yield was 97.1%. The extracted solution had the following composition.

| $H_3PO_4$: | 135 g./liter |
|---|---|
| $SO_4$: | 1.8 g./liter |

In the purification battery having 15 stage extractors, the extracted solution was in counter current contact with the pure phosphoric acid solution obtained in the washing battery at a solvent ratio on a volume basis of solvent phase/pure phosphoric acid of 12.5. In the operation, 4.8 wt. parts of 45% aqueous solution of potassium hydroxide was added to the tenth stage. As a result, the concentration of potassium component in the aqueous phases in the first to tenth stages of the purification battery were maintained to 1.1 gram equivalent.

The solvent phase obtained from the purification battery was in counter current contact with pure water in the washing battery having ten stage extractors to obtain a pure phosphoric acid solution having the following composition.

| $H_3PO_4$: | 42.0% |
|---|---|
| $SO_4$: | 12 ppm |
| Si: | 3 ppm |
| F: | 5 ppm |
| Fe: | <0.1 ppm |
| Al: | <0.1 ppm |
| Ti: | <0.1 ppm |
| K: | <1 ppm |

EXAMPLE 4

100 Wt. parts of the wet process phosphoric acid having the following composition was mixed with 70 wt. parts of an aqueous phase obtained in the purification battery and the precipitated sodium silcofluoride was separated by a filtration.

| $P_2O_5$: | 35.2% |
|---|---|
| $SO_4$: | 1.9% |
| Si: | 0.18% |
| F: | 0.68% |
| Fe: | 0.32% |
| Al: | 0.42% |
| Mg: | 0.15% |
| Ti: | 120 ppm |

The filtrate was in counter current contact with n-butanol in the extraction battery having 16 stage extractors at a solvent ratio on a volume basis of n-butanol/filtrate of 4.1. In the operation, 11.4 wt. parts of 98% sulfuric acid was added to the third stage. The amount of sulfuric acid corresponds to 1.64 gram equivalent times given by subtracting 0.31 gram equivalent time of sulfuric acid in the wet process phosphoric acid from 1.95 gram equivalent times to the total of the cations except hydrogen ions in the wet process phosphoric acid and potassium added to the purification battery. The yield was 96.2%. The extracted solution had the following formulation.

| $H_3PO_4$: | 131 g./liter |
|---|---|
| $SO_4$: | 1.9 g./liter |

In the purification battery having 15 stage extractors, the extracted solution was in counter current contact with the pure phosphoric acid solution obtained in the following washing battery at a solvent ratio on a volume basis of solvent phase/pure phosphoric acid of 10. In the operation, 3.6 wt. parts of 48% aqueous solution of sodium hydroxide was added to the tenth stage. As a result, the concentrations of sodium component in the aqueous phases in the stages were maintained to 0.85 gram equivalent/liter.

The solvent phase obtained from the purification battery was in counter current contact with pure water in the washing battery having 12 stage extractors to obtain the following pure phosphoric acid solution.

| $H_3PO_4$: | 29.5% |
|---|---|
| $SO_4$: | 20 ppm |
| Si: | 5 ppm |
| F: | 10 ppm |
| Fe: | <0.1 ppm |
| Al: | <0.1 ppm |
| Ti: | <0.1 ppm |
| Na: | <1 ppm |

We claim:

1. A process for purifying wet-process $H_3PO_4$, comprising:
   (a) introducing butanol and wet process $H_3PO_4$ having a $P_2O_5$ concentration of more than 35 wt percent into a multistage extraction battery wherein $H_2SO_4$ is added to the fifth or higher stage from the discharge of the extracted solution and at second or higher stage from the raffinate discharge, the amount of said $H_2SO_4$ being in a gram equivalent ratio given by subtracting the amount of $H_2SO_4$ present in said wet process $H_3PO_4$ from 1.2 to 2.0 times the sum of total cation impurities present in said wet process $H_3PO_4$ and the total amount of alkali metal or magnesium cations added during purification step;
   (b) introducing said extracted solution having $H_3PO_4$ concentration of about 130 to about 180 g/liter into a multistage purification battery wherein cation selected from the group consisting of $Na^+$, $K^+$, $Mg^{++}$ and mixtures thereof is added at second or higher stage from the stage of discharging the solvent phase and second or higher stage from the discharge of aqueous phase, the concentration of said cation in said aqueous phase being more than about 0.4g equivalent per liter; and
   (c) introducing purified solvent extract obtained from step (b) into a stripping battery and recovering purified $H_3PO_4$.

2. The process of claim 1 wherein said cation is $Mg^{++}$ derived from a magnesium compound.

3. The process of claim 1 wherein the concentration of $H_2SO_4$ in the wet-process $H_3PO_4$ introduced into said multistage extraction is more than 0.5 wt %.

* * * * *